(12) United States Patent
Lozano et al.

(10) Patent No.: US 11,067,064 B2
(45) Date of Patent: Jul. 20, 2021

(54) PROPULSION SYSTEMS INCLUDING A SUBLIMABLE BARRIER

(71) Applicant: Massachusetts Institute of Technology, Cambridge, MA (US)

(72) Inventors: Paulo C. Lozano, Arlington, MA (US); David Krejci, Vienna (AT)

(73) Assignee: Massachusetts Institute of Technology, Cambridge, MA (US)

( * ) Notice: Subject to any disclaimer, the term of this patent is extended or adjusted under 35 U.S.C. 154(b) by 484 days.

(21) Appl. No.: 15/905,738

(22) Filed: Feb. 26, 2018

(65) Prior Publication Data

US 2019/0264666 A1 Aug. 29, 2019

(51) Int. Cl.
*F03H 1/00* (2006.01)
*B64G 1/40* (2006.01)

(52) U.S. Cl.
CPC ........... *F03H 1/0012* (2013.01); *B64G 1/405* (2013.01)

(58) Field of Classification Search
CPC .................. B64G 1/402; F03H 1/00–0093
See application file for complete search history.

(56) References Cited

U.S. PATENT DOCUMENTS

| | | | |
|---|---|---|---|
| 3,532,297 A | 10/1970 | Maes | |
| 6,216,445 B1 | 4/2001 | Byers et al. | |
| 7,604,705 B2 | 10/2009 | Orbey et al. | |
| 7,863,581 B2 | 1/2011 | Lozano et al. | |
| 8,030,621 B2 | 10/2011 | Lozano et al. | |
| 8,324,593 B2 | 12/2012 | Lozano et al. | |
| 8,785,881 B2 | 7/2014 | Lozano et al. | |
| 8,791,411 B2 | 7/2014 | Lozano et al. | |
| 9,358,556 B2 | 6/2016 | Velasquez-Garcia et al. | |
| 9,669,416 B2 | 6/2017 | Velasquez-Garcia et al. | |
| 2004/0167241 A1* | 8/2004 | Scherzer | B29C 44/005 521/79 |
| 2010/0024385 A1 | 2/2010 | Gabriel et al. | |
| 2016/0107178 A1 | 4/2016 | Velasquez-Garcia et al. | |
| 2016/0297549 A1* | 10/2016 | Lozano | F03H 1/0012 |
| 2016/0333865 A1* | 11/2016 | Demmons | B05B 5/0255 |
| 2016/0376150 A1 | 12/2016 | Lozano et al. | |
| 2017/0036784 A1 | 2/2017 | Kawaguchi et al. | |

(Continued)

OTHER PUBLICATIONS

Omnexus "Polyethersulfone" (Year: 2020).*

(Continued)

*Primary Examiner* — Gerald L Sung
*Assistant Examiner* — William L Breazeal
(74) *Attorney, Agent, or Firm* — Wolf, Greenfield & Sacks, P.C.

(57) ABSTRACT

The present disclosure is related to propulsion systems (e.g., electrospray devices such as electrospray emitters and/or electrospray thrusters) having a sublimable barrier that may act as a passive valve for a propellant (e.g., a source of ions). The sublimable barrier may be located and arranged such that it physically separates a propellant, such as a source of ions, from an ambient environment exterior to the propulsion system. After the sublimable barrier has sublimated due to exposure to vacuum, and where appropriate diffused out of the propulsion system, the propulsion system may be operated normally. In some embodiments, the sublimable barrier may be a solid sublimable organic compound.

44 Claims, 5 Drawing Sheets

(56) References Cited

U.S. PATENT DOCUMENTS

2018/0076003 A1    3/2018   Lozano et al.

OTHER PUBLICATIONS

Plastics Today "Dip molding and coating: A versatile, flexible plastics process you may never have heard of" (Year: 2015).*
EFunda "Introduction to Dip Molding and Coating" (Year: 2015).*
Recycled Plastic "Thermoplastics vs Thermosetting Plastics" (Year: 2015).*
International Search Report and Written Opinion for Application No. PCT/US2019/017167 dated Apr. 30, 2019.
Polzin et al., Iodine hall thruster propellant feed system for a cubesat. Amer Inst Aeronautics and Astronautics. Jul. 2014;1-10.
U.S. Appl. No. 14/892,847, filed Nov. 20, 2015, Velasquez-Garcia et al.
U.S. Appl. No. 14/681,264, filed Apr. 8, 2015, Lozano et al.
U.S. Appl. No. 15/805,050, filed Nov. 6, 2017, Lozano et al.
U.S. Appl. No. 14/661,855, filed Mar. 18, 2015, Lozano et al.
Delle Site, The vapor pressure of environmentally significant organic chemicals: A review of methods and data at ambient temperature. J Phys Chem Ref Data. 1997;26(1):157-93.

\* cited by examiner

PROPULSION SYSTEMS INCLUDING A SUBLIMABLE BARRIER

GOVERNMENT SUPPORT

This invention was made with Government support under Grant No. NRO000-13-C-0516 awarded by the National Reconnaissance Office (NRO). The Government has certain rights in the invention.

FIELD

Embodiments related to propulsion systems including a propellant and a sublimable barrier as well as their methods of use and manufacture are disclosed.

BACKGROUND

Propulsion systems utilizing propellants may be actively fed (e.g., using pressure) or passively fed (e.g., using capillary forces). For example, electrospray emitter devices are propulsion systems that produce thrust by accelerating ions from a source of ions in response to an applied potential above which Taylor Cone formation occurs. Some electrospray emitter devices use capillary forces to passively feed the emitter(s) with liquid propellant. The propellant (e.g., a source of ions) used in these electrospray emitters may be an ionic liquid, or other appropriate fluid, which allows for a scalable specific impulse in some electrospray emitters for times of approximately 500 seconds to 5000 or more seconds. Depending on the application, a plurality of electrospray emitters can be arranged together (e.g., in a line or in an array) to produce a predetermined thrust, for use in applications such as space propulsion applications. Such emitters may be manufactured using a number of different fabrication techniques.

SUMMARY

In one aspect, a propulsion system includes a propellant. The propulsion system may have a sublimable barrier comprising a solid sublimable organic compound physically separating the propellant from an ambient environment outside of the propulsion system.

In another aspect, a method of making a propulsion system may include depositing a sublimable organic compound onto and/or within one or more components of a propulsion system to form a sublimable barrier that physically separates a propellant from an ambient environment outside of the propulsion system.

In yet another aspect, a method of using a propulsion system may include deploying the propulsion system in vacuum. The method of using the propulsion system may include sublimating a sublimable barrier isolating a propellant from an ambient environment outside of the propulsion system over a predetermined amount of time after deploying the propulsion system in the vacuum.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

The Inventors have recognized limitations of prior propulsion systems (e.g., electrospray thruster devices), which in some instances may be passively or actively fed with propellant. For example, some propulsion systems may be fed with propellant using capillarity. Specifically, the Inventors discovered during field testing of a passively fed electrospray thruster that some, or all, of the propellant leaked out from the propulsion system prior to final deployment. This leakage may have occurred due to the conditions to which the propulsion system was exposed before and/or during launch. Specifically, the Inventors have recognized that during handling and launch, a satellite may be exposed to rough handling and/or bumping, significant vibration, changes in orientation, and/or vacuum all of which may lead to leakage of propellant into the system. In addition, the Inventors have recognized that the unsealed propellant may be exposed to atmosphere during storage and launch which may lead to absorption of gases from the atmosphere by the propellant. Further, depending on the type of propellant used this exposure to atmosphere may be undesirable. For example, the absorption of oxygen, water vapor, and/or other gases into the propellant may be undesirable.

In view of the above, the Inventors have recognized the benefits associated with the use of a temporary sublimable barrier that physically isolates the propellant from the surrounding atmosphere outside of a propulsion system. Further, the Inventors have recognized that it may be desirable for the sublimable barrier to either rupture, or otherwise be removed, due to sublimation of the barrier after deployment of the propulsion system, e.g., into a vacuum such as that experienced in low Earth orbit or space. Thus, unintentional leakage and/or contamination of the propellant during handling and launch prior to deployment may be prevented.

In some embodiments, a sublimable barrier may be included in a propulsion system. Specifically, the sublimable barrier may be located along a flow path extending from a propellant source to an outlet of the propulsion system such that it physically separates the propellant from the environment exterior to the propulsion system. Depending on the particular application, the propulsion system may be electrospray device such as an electrospray emitter or electrospray thruster. Additionally, depending on the particular type of propulsion system, the propellant of the propulsion system may include, for example, a source of ions such as an ionic liquid, a room-temperature molten salt, a combination of the foregoing, and/or any other appropriate propellant. Examples of ionic liquid propellants include but are not limited to EMI-BF$_4$ (1-ethyl-3-methylimidazolium tetrafluoroborate), EMI-CF$_3$BF$_3$ (1-ethyl-3-methylimidazolium trifluoromethyltrifluoroborate), EMI-GaCl$_4$ (1-ethyl-3-methylimidazolium tetrachlorogallate), EMI-Im (1-ethyl-3-methylimidazolium bis(trifluoromethylsulfonyl)imide), mixtures containing EMIF•2.3 HF (1-ethyl-3-imidazolium fluoride), BMI-BF$_4$ (1-butyl-3-methylimidazolium tetrafluoroborate), BMI-CF$_3$BF$_3$ (1-butyl-3-methylimidazolium trifluoromethyltrifluoroborate), BMI-GaCl$_4$ (1-butyl-3-methylimidazolium tetrachlorogallate), BMI-Im (1-butyl-3-methylimidazolium bis(trifluoromethylsulfonyl)imide), or mixtures containing BMIF•2.3 HF (1-butyl-3-imidazolium fluoride).

For the sake of clarity, the various embodiments described herein are primarily directed to propulsion systems including electrospray emitters and electrospray thrusters. However, it should be understood that a sublimable barrier may be used in any suitable propulsion system having any suitable propellant as the disclosure is not so limited.

The currently disclosed sublimable barriers may advantageously be introduced into existing propulsion systems without adding further mechanical components or altering the design of the propulsion system. Further, these sublimable barriers may be selectively removed, or activated, without the use of an actively applied force, motion, or similar suitable stimulus other than that provided by the surrounding environment. Thus, the disclosed sublimable barriers may be considered to be a passively actuated system. In contrast, a propulsion system that includes an active valve having one or more mechanical components that are actively actuated to apply a force and/or movement to activate a system may add significantly more to the weight and/or size of a propulsion system when compared to the disclosed sublimable barriers. Thus, the disclosed sublimable barriers may also offer reduced weight, size, and system complexity as well as increased system reliability. However, in some embodiments, an active element, such as a heater that is thermally coupled to the component the sublimable barrier is disposed on and/or within, may be include to accelerate a rate of sublimation of a sublimable barrier may also be included. Alternatively, a component the sublimable barrier is disposed on and/or within may be resistively heated by passing electrical current through the component to generate heat within the component to accelerate the rate of sublimation. Of course, embodiments not including a heating arrangement are also contemplated.

In some embodiments, a sublimable barrier may be introduced in/on any appropriate component disposed along a flow path of the propellant extending from the propellant source to an exterior of a propulsion system. This may isolate the propellant from the exterior environment. Further, depending on the particular location, the sublimable barrier may also prevent the flow of propellant to one or more components of the propulsion system located along the propellant flow path to avoid contamination and/or leakage of the propellant within the propulsion system. In such an embodiment, the sublimable barrier may be coated on, disposed on, disposed between, and/or impregnated into one or more components of the propulsion system along the propellant flow path. Such an embodiment may be easily integrated with a number of propulsion systems including passively fed propulsion systems that are fed using, for example, capillarity. Specifically, the sublimable barrier may be easily integrated with components including capillaries as well as selectively blocking flow through those capillaries prior to sublimation. Thus, the disclosed sublimable barriers may enable the desired selective isolation of a propellant using easily implemented processes that do not require drastic design and/or manufacturing changes as compared to the use of actively actuated systems.

As noted above, in some embodiments, a propulsion system may include an electrospray thruster. In such an embodiment, the electrospray thruster may include an emitter body or an array of emitter bodies with a sublimable barrier that physically coats, is impregnated with, and/or is otherwise associated with the one or more emitter bodies so as to physically separate the propellant from the exterior of the propulsion system. Depending on the particular design, the one or more emitter bodies may include a base and a tip. In embodiments where the one or more emitter bodies include pores to passively transport the propellant to the emitter body tips, some or all of the pores of the porous emitter body may be impregnated with the sublimable barrier material such that flow of the propellant through the one or more emitter bodies is prevented. Specifically, the sublimable barrier material may be solid such that it prevents the flow of propellant into the pores in which the sublimable barrier material is located.

In some embodiments, a propulsion system may include a substrate that one or more emitter bodies extend from. Thus, the substrate may be located along a flow path between the propellant (e.g., ion source) and the ambient environment outside of the propulsion system. In embodiments where the substrate comprises a porous material that fluidly couples the propellant source to the emitter bodies, at least a portion, and in some instances substantially all, of the pores of the porous substrate may impregnated with a sublimable barrier material. Alternatively, the substrate may be coated with the sublimable barrier material. In either case, the sublimable barrier may prevent the flow of propellant through the substrate to the one or more emitter bodies.

In yet another embodiment, a propulsion system may include a plug or other component which is disposed between one or more emitter bodies of the propulsion system and the ambient environment outside of the propulsion system. In such an embodiment, a sublimable barrier material may be disposed on, coated on, impregnated into, and/or otherwise associated with the plug or isolation valve. Accordingly, the sublimable barrier may block the flow of propellant to the one or more emitter bodies and outside ambient environment through the plug or isolation valve.

In some embodiments, a propulsion system may include a reservoir that contains the propellant of the propulsion system. Similar to the above, this reservoir may be fluidly coupled to the other various components located along a flow path of the propellant through the system. Thus, a sublimable barrier that is coated on, disposed on, impregnated into, or otherwise associated with at least a portion of the reservoir may selectively block a flow of the propellant to the rest of the system from the reservoir. For example, a portion of the reservoir adjacent an outlet from the reservoir may include a porous material that may be at least partially impregnated or coated with a sublimable material. Thus, the resulting sublimable barrier would prevent a flow of propellant through the reservoir outlet.

In the above noted embodiments, a sublimable barrier may be impregnated into one or more components made from porous materials including an interconnected network of pores including, for example, an emitter body, substrate, porous plug, reservoir, or other component or portion of a propulsion system. In such an embodiment, at least a portion of the pores of the component including the sublimable barrier may be impregnated with the propellant. For example, a downstream, upstream, and/or other portion of the component may be impregnated with the sublimable barrier material such that propellant flow through the component is substantially prevented. In another embodiment, the surface pores of the component may be impregnated with the sublimable barrier material. Alternatively, in yet another embodiment, substantially all of the component may be impregnated with the sublimable barrier material. To effectively block the flow of fluid through a component, the sublimable barrier material may be solid. It should be understood that a sublimable barrier material may not completely fill all of the pores it is disposed within. In such an instance, the sublimable barrier material may at least partially fill the associated pores of a component to an extent that prevents the flow of propellant through the pores. However, instances in which the sublimable barrier material completely fills the associated pores it is disposed within are also contemplated.

It should be understood that the disclosed propulsion systems may include any appropriate type of structure capable of passively feeding propellant to one or more thrusters, outlets, emitter bodies, or other structures of the system. In some embodiments, the structure is such that the propellant may be continuously transported through capillarity to the tip of an emitter body so as to provide propellant without an active pump. Non-limiting examples of structures capable of passively feeding propellant may include, but are not limited to, a pore size gradient, grooves, cylindrical tubes, thin plate-shaped openings, or a combination thereof, and/or any other appropriate structure. For example, in one embodiment, the one or more components of a propulsion system may be assembled such that a network of pores extends from the reservoir to a tip of an emitter body or bodies. Further, to help facilitate the flow of propellant toward the outlet, in a propulsion system including one or more porous components, a pore size gradient across the one or more components may be selected such that the pore size of the different components decreases in a downstream direction directed towards the tip of one or more emitter bodies, or other appropriate outlet of the propulsion system. In such an embodiment, the average pore size of upstream components may be larger than the average pore size of the associated downstream components. For instance, the pores within a portion of a reservoir may be larger than an interconnecting plug which may have larger pores than an associated substrate which may have larger pores than an associated one or more emitter bodies. Of course, while embodiments including pores have been described, embodiments in which other structures such as grooves, tubes, surface protrusions/features, and/or any other structure capable of transporting propellant to a desired portion of a propulsion system may also be used as the disclosure is not so limited. Also, embodiments in which propellant is actively fed to a thruster of a propulsion system are also contemplated.

In some embodiments, a reservoir may serve as a distal electrode in an electrospray device. In some embodiments, the distal electrode is electrically connected to an extractor electrode downstream of the emitter body (e.g., past the tip of the emitter body) and electrically connected to a power source. In some embodiments, the distal electrode is electrically connected to an extractor electrode downstream of the emitter body, to a power source, and to an accelerator grid. In some embodiments, after the sublimable barrier has been removed (e.g., by sublimation and/or diffusion), the power source can apply a voltage to the distal electrode, and thereby to the source of ions (e.g., ionic liquid), relative to the extractor electrode. This application of voltage in some embodiments may result in emission of current from the tip of the emitter body. In some embodiments, the application of voltage above a threshold voltage can cause the formation of a Taylor Cone at the tip of the emitter body and cause the emission of ions from the tip of the emitter body.

The different components located along a flow path of a propellant including, for example, the reservoir, plug, substrate, and emitter bodies described above, may be made from any appropriate material that is compatible with the propellant and the particular type of propulsion being used. In one embodiment possible materials include, but are not limited to, dielectric materials (e.g., a ceramic, glass, or other oxide material), carbon, metallic materials (e.g., silver, stainless steel, tungsten, nickel, magnesium, molybdenum, titanium, any combination thereof, or any of these metals coated with a noble metal material such as platinum or gold), and/or any other desirable material.

It should be understood that the disclosed propulsion systems may include any appropriate type of propellant. Non-limiting examples of propellant that may be used in the propulsion systems described herein may include, but are not limited to, one or more ionic liquids (e.g. $EMI-BF_4$ (1-ethyl-3-methylimidazolium tetrafluoroborate), $EMI-CF_3BF_3$ (1-ethyl-3-methylimidazolium trifluoromethyltrifluoroborate), $EMI-GaCl_4$ (1-ethyl-3-methylimidazolium tetrachlorogallate), EMI-Im bis(1-ethyl-3-methylimidazolium bis(trifluoromethylsulfonyl)imide), mixtures containing EMIF•2.3 (1-ethyl-3-imidazolium fluoride), $BMI-BF_4$ (1-butyl-3-methylimidazolium tetrafluoroborate), $BMI-CF_3BF_3$ (1-butyl-3-methylimidazolium trifluoromethyltrifluoroborate), $BMI-GaCl_4$ (1-butyl-3-methylimidazolium tetrachlorogallate), BMI-Im (1-butyl-3-methylimidazolium bis(trifluoromethylsulfonyl)imide), or mixtures containing BMIF•2.3 HF (1-butyl-3-imidazolium fluoride)), one or more room-temperature molten salts (e.g. $EMI-BF_4$ (1-ethyl-3-methylimidazolium tetrafluoroborate), $EMI-CF_3BF_3$ (1-ethyl-3-methylimidazolium trifluoromethyltrifluoroborate), $EMI-GaCl_4$ (1-ethyl-3-methylimidazolium tetrachlorogallate), EMI-Im (1-ethyl-3-methylimidazolium bis(trifluoromethylsulfonyl)imide), mixtures containing EMIF•2.3 HF (1-ethyl-3-imidazolium fluoride), $BMI-BF_4$ (1-butyl-3-methylimidazolium tetrafluoroborate), $BMI-CF_3BF_3$ (1-butyl-3-methylimidazolium trifluoromethyltrifluoroborate), $BMI-GaCl_4$ (1-butyl-3-methylimidazolium tetrachlorogallate), BMI-Im (1-butyl-3-methylimidazolium bis(trifluoromethylsulfonyl)imide) or mixtures containing BMIF•2,3 HF (1-butyl-3-imidazolium fluoride)), or a combination thereof, to name a few.

In some embodiments, a sublimable barrier may comprise a solid sublimable organic compound (e.g., aromatic hydrocarbon, polycyclic aromatic hydrocarbon, polychlorinated biphenyl congener) that physically separates the propellant of a propulsion system from an ambient environment outside of the propulsion system. In some embodiments, the organic compound is a hydrocarbon which in some instances may be one or more of a multiple aromatic hydrocarbon, multiple aromatic hydrocarbons, a polycyclic aromatic hydrocarbon, multiple polycyclic aromatic hydrocarbons, and/or any other appropriate compound. Specific non-limiting examples may include, but are not limited to, biphenyl, fluorene, fluoranthene, acenaphthene, phenanthrene, naphthalene, combinations of the foregoing, and/or any other appropriate sublimable material capable of sublimating when exposed to vacuum. In one specific embodiment, the sublimable barrier material may include fluorene, biphenyl, fluoranthene, or a mixture thereof.

In some embodiments, an organic compound used as a sublimable barrier material may have molecular weight selected to have favorable sublimation and diffusion kinetics. For example, and without wishing to be bound by theory, lower molecular weight compounds will exhibit faster sublimation and diffusion kinetics, but this should be balanced with the desire to have the material not sublimate to a degree that it unseals the propulsion system prior to deployment. In some embodiments, an organic compound may have a molecular weight of at most 500 Da, at most 400 Da, at most 300 Da, at most 250 Da, at most 200 Da, at most 190 Da, at most 180 Da, at most 178 Da, at most 170 Da, at most 166 Da, at most 160 Da, at most 154 Da, at most 150 Da, at most 140 Da, at most 130 Da, at most 128 Da, at most 120 Da, at most 110 Da, or any other appropriate molecular weight. Correspondingly, the organic compound may have a molecular weight of at least 100 Da, at least 110 Da, at least 120 Da, at least 130 Da, at least 140 Da, at least 150 Da, at least 160 Da, at least 170 Da, at least 180 Da, at least 190 Da, at least 200 Da, at least 300 Da, or at least 400 Da. Combinations of the above-referenced ranges are also possible (e.g., between or equal to 100 Da and 500 Da). In some embodiments, the organic compound may have a molecular weight between or equal to 100 Da and 300 Da. However, embodiments in which molecular weights both larger and smaller than those noted above are used are also contemplated as the disclosure is not so limited.

In some embodiments, the sublimable barrier material may be a solid at the temperatures and pressures that the propulsion system may be expected to be exposed to during manufacturing, handling, launch and deployment. For example, a sublimable barrier material may be solid at a temperature and pressure of 20° C. and 1 atm. Correspondingly, a sublimable barrier material may have a melting temperature at 1 atm of at least 50° C., at least 60° C., at least 70° C., at least 80° C., at least 90° C., or at least 100° C. The sublimable barrier material may also have a melting temperature at 1 atm of at most 200° C., at most 190° C., and most 180° C., at most 170° C., at most 160° C., most 150° C., at most 140° C., at most 130° C., at most 120° C., or at most 110° C. Combinations of the above-referenced ranges also possible (e.g., between or equal to 50° C. and 200° C. at 1 atm). In some embodiments, the sublimable barrier material may have a melting temperature ($T_m$) between or equal to 100° C. and 150° C. at 1 atm. For example, the sublimable barrier material may be: fluoranthene with a melting temperature of 111° C. at 1 atm; fluorene with a melting temperature of 116° C. at 1 atm; acenaphthene with a melting temperature of 96° C. at 1 atm; or biphenyl with a melting temperature of 71° C. at 1 atm. However, embodiments in which materials with melting temperature both lower and higher than those noted above are used are also contemplated. Additionally, to facilitate manufacturing of a sublimable barrier, in some embodiments, the sublimable barrier material may have melting temperature that is less than a melting temperature of the component, or components, it is associated with in a propulsion system (e.g., emitter body, substrate, plug, reservoir).

In some embodiments, the sublimable barrier material may have a suitably low vapor pressure such that the sublimable barrier does not rupture during storage and handling prior to launch. However, the vapor pressure of sublimable barrier material may also be sufficiently high such that the sublimable barrier sublimates at a sufficiently high rate so as not to delay the functioning of the propulsion system beyond a predetermined duration. In some embodiments, the sublimable barrier material may have a vapor pressure at 25° C. of at least 0.0001 Pa, at least 0.0002 Pa, at least 0.0003 Pa, at least 0.0004 Pa, at least 0.0005 Pa, at least 0.0006 Pa, at least 0.0007 Pa, at least 0.0008 Pa, at least 0.0009 Pa, at least 0.001 Pa, at least 0.002 Pa, at least 0.003 Pa, at least 0.004 Pa, at least 0.005 Pa, at least 0.006 Pa, at least 0.007 Pa, at least 0.008 Pa, or at least 0.009 Pa. Correspondingly, the sublimable barrier material may have a vapor pressure 25° C. of at most 10 Pa, at most 9 Pa, at most 8 Pa, at most 7 Pa, at most 6 Pa, at most 5 Pa, at most 4 Pa, at most 3 Pa, at most 2 Pa, at most 1 Pa, at most 0.9 Pa, at most 0.8 Pa, at most 0.7 Pa, at most 0.6 Pa, at most 0.5 Pa, at most 0.4 Pa, at most 0.3 Pa, at most 0.2 Pa, at most 0.1 Pa, at most 0.09 Pa, at most 0.08 Pa, at most 0.07 Pa, at most 0.06 Pa, at most 0.05 Pa, at most 0.04 Pa, at most 0.03 Pa, at most 0.02 Pa, or at most 0.01 Pa. Combinations of the above-referenced ranges are possible (e.g., between or equal to 0.0001 Pa and 10 Pa at 25° C.). In some embodiments, the sublimable barrier may have a vapor pressure at 25° C. between or equal to 0.0001 Pascal (Pa) and 10 Pa, 0.001 Pa and 2 Pa, or any other appropriate range both smaller and larger than those noted above. Further, in some specific embodiments, a vapor pressure of the sublimable material at 25° C. may be 0.001 Pa, 0.08 Pa, 1.19 Pa, or 1.3 Pa.

In some embodiments, the sublimable barrier material, when solid, may have limited solubility in the propellant to help prevent contamination of the propellant and/or to avoid dissolving the sublimable barrier. However, during use as the barrier begins to break down due to sublimation, the propellant may begin to flow from the reservoir towards the ambient environment outside of the propulsion system. Further, this flow of propellant may occur even when not all of the sublimable barrier material has sublimated from the propulsion system (e.g., by sublimation and/or by diffusion) which may lead to some of the sublimable barrier material becoming immersed in the propellant isolating it from the exterior environment. Such circumstances lead to a competing objective of wanting to remove this sublimable material immersed in the propellant from the system to prevent it from impeding flow through the propulsion system. Therefore, under such circumstances, some limited solubility of the sublimable barrier material within the propellant may be desirable in order to facilitate the complete removal of the barrier and improve the flow of the propellant through the propulsion system. Accordingly, a sublimable barrier material may be chosen to have a solubility in the propellant of at least 0.0001 mg/L, at least 0.0002 mg/L, at least 0.0003 mg/L, at least 0.0004 mg/L, at least 0.0005 mg/L, at least 0.0006 mg/L, at least 0.0007 mg/L, at least 0.0008 mg/L, at least 0.0009 mg/L, at least 0.001 mg/L, at least 0.002 mg/L, at least 0.003 mg/L, at least 0.004 mg/L, at least 0.005 mg/L, at least 0.006 mg/L, at least 0.007 mg/L, at least 0.008 mg/L, at least 0.009 mg/L, at least 0.01 mg/L, at least 0.02 mg/L, at least 0.03 mg/L, at least 0.04 mg/L, at least 0.05 mg/L, at least 0.06 mg/L, at least 0.07 mg/L, at least 0.08 mg/L, or at least 0.09 mg/L. The sublimable barrier material may also have a solubility in the propellant of at most 10 mg/L, at most 9 mg/L, at most 8 mg/L, at most 7 mg/L, at most 6 mg/L, at most 5 mg/L, at most 4 mg/L, at most 3 mg/L, at most 2 mg/L, at most 1 mg/L, at most 0.9 mg/L, at most 0.8 mg/L, at most 0.7 mg/L, at most 0.6 mg/L, at most 0.5 mg/L, at most 0.4 mg/L, at most 0.3 mg/L, at most 0.2 mg/L, or at most 0.1 mg/L. Combinations of the above-referenced ranges are also possible (e.g., between or equal to 0.0001 mg/L and 10 mg/L). In some embodiments, the sublimable barrier material may have a solubility in a liquid propellant between or equal to 0.1 mg/L and 1 mg/L, 1 mg/L and 10 mg/L, or any other desired range both smaller and larger than those noted above.

In some embodiments, sublimation of substantially all of a sublimable barrier may occur over a suitable duration under conditions wherein the ambient environment has a pressure of less than or equal to 80 microTorr (i.e., less than or equal to 10,000 microPascals). This pressure condition of the ambient environment may also be referred to herein as vacuum. In some embodiments, ambient environments at which significant amounts of sublimation may occur may have a pressure that is less than or equal to 80 microTorr (i.e., 10,000 microPascals), 1 microTorr (i.e., about 133 microPascals), and/or any other appropriate pressure. In some embodiments, the ambient environment has a pressure at or below the vapor pressure of the sublimable barrier material. Further, the term "substantially all," in reference to the amount of the sublimable barrier that has sublimated, herein may refer to greater than or equal to 95%, greater than or equal to 96%, greater than or equal to 97%, greater than or equal to 98%, or greater than or equal to 99% (e.g., about 100%).

In some embodiments, the sublimation of a sublimable barrier material from a propulsion system may be diffusion-limited (e.g., the rate of sublimation is greater than the rate of diffusion of the sublimated sublimable barrier material). This may occur, for example, due to long diffusion distances, and corresponding low diffusion rates, through one or more porous components of a propulsion system that form a tortuous path for the sublimated sublimable barrier to diffuse through. In some embodiments, the properties of the sublimable barrier material (e.g., melting temperature, vapor pressure, molecular weight, etc.) and the diffusion rate of the sublimated material (e.g., pore size, tortuosity, mean flow path length, etc.) through the one or more components of the propulsion system may be selected to control a duration of removal of the sublimable barrier material when exposed to vacuum after deployment. Again a vacuum may correspond to pressures less than or equal to 80 microTorr (i.e., less than or equal to 10,000 microPascals) (e.g., less than or equal to 300 microPascals).

In view of the above, substantially all of a sublimable barrier material may have sublimated in a suitable duration, provided that the ambient environment has a pressure at or below the vapor pressure of the sublimable barrier material. In some embodiments the sublimation of the barrier may be diffusion-limited. In either case, depending on the embodiment, substantially all of a sublimable barrier material may have sublimated within 5 weeks, within 4 weeks, within 3 weeks, within 2 weeks, within 1 week, within 6 days, within 5 days, within 4 days, within 3 days, within 2 days, within 1 day, within 20 hours, within 16 hours, within 12 hours, within 8 hours, within 4 hours, within 3 hours, within 2 hours, within 1 hour, or within 30 minutes. In some embodiments, substantially all of the sublimable barrier material may have sublimated after at least 30 minutes, at least 1 hour, at least 2 hours, at least 3 hours, at least 4 hours, at least 8 hours, at least 12 hours, at least 16 hours, at least 20 hours, at least 1 day, at least 2 days, at least 3 days, at least 4 days, at least 5 days, or at least 6 days. Combinations of the above-referenced ranges are also possible (e.g., substantially all of a barrier may sublimate in a time that is between or equal to 30 minutes and 5 weeks). In another embodiment, substantially all of a sublimable barrier material will have sublimated under a vacuum over a duration that is between or equal to 1 hour and 1 week, 4 hours and 4 days, or any other appropriate time period including durations both shorter and longer than those noted above. Some appropriate methods for measuring the sublimation of a sublimable barrier may include measuring mass change of a portion of the propulsion system comprising the sublimable barrier as a function of time and temperature when the propulsion system is exposed to different pressures below the vapor pressure of the sublimable barrier; such measurements are insensitive to background pressure. A residual gas analyzer may be used in vacuum to measure and track the partial pressure of the sublimable barrier material over time. For some sublimable barrier materials, methods for measuring the sublimation of a sublimable barrier may include optically measuring a depletion rate by optically tracking a sublimation front if a transparent material is used. It should be understood that materials that are transparent to wavelengths of light other than optical light, including for example, ultraviolet, infrared, and other appropriate wavelengths of light are contemplated. These methods for measuring sublimation rate are possible post-assembly and without disassembly of the propulsion system.

A sublimable barrier may be formed in any appropriate manner and may either be deposited onto and/or impregnated into one or more components of a propulsion system. Appropriate deposition techniques include, but are not limited to, chemical vapor deposition (CVD), physical vapor deposition (PVD) (e.g., thermal evaporation, sputtering), casting (e.g., spin casting), a combination thereof, as well as other ways of depositing a desired sublimable barrier material. In another embodiment, a sublimable barrier material may be deposited by pouring the sublimable barrier material in fluid form onto a desired component and/or melt spinning the sublimable barrier material in fluid form onto a desired component. After deposition, the sublimable barrier material may be permitted to cool and solidify to form the final sublimable barrier. In embodiments where a sublimable barrier material is deposited in fluid form, the sublimable barrier material may have a melting temperature that is less than a melting temperature, softening temperature, glass transition temperature, or other desired temperature threshold for the other corresponding components of the propulsion system.

In some embodiments, when a sublimable barrier material is deposited in fluid form and subsequently cooled and solidified, small cracks, voids, and/or other defects may form in the solidified sublimable barrier material. These defects in the barrier may permit leakage and/or contamination of the propellant. Without wishing to be bound by theory, the defects may form due to thermal shrinkage and/or crystallization of the deposited sublimable barrier material. Accordingly, in some embodiments, it may be desirable to further process the deposited material to reduce the presence of defects in the sublimable barrier. In one such embodiment, the deposited material may be cyclically melted and solidified to reduce the presence of defects in the sublimable barrier. In order to further reduce defects in a sublimable barrier, the cyclic melting and solidification process may further comprise depositing additional sublimable barrier material during the individual cycles. In one embodiment, the method may include cyclically melting the sublimable barrier material, depositing additional sublimable barrier material, and solidifying the sublimable barrier material. Depending on the particular embodiment, the additional sublimable barrier material may be deposited either before or after re-melting of the already present sublimable barrier material. Of course embodiments in which additional material is not deposited during the cyclic melting and solidification of the deposited sublimable barrier material are also contemplated.

In the above embodiments, any number of melting and solidification cycles where the temperature of the deposited material is cyclically controlled to be above and below the melting temperature of the sublimable barrier material may be used. For example, the number of cycles may be greater than 2 cycles, 3 cycles, 4 cycles, 5 cycles, 6 cycles, 7 cycles, 8 cycles, 9 cycles, 10 cycles, or any other appropriate number of cycles. Correspondingly, the number of melting and solidification cycles may be less than or equal to 10 cycles, 9, cycles, 8 cycles, 7 cycles, 6 cycles, or any other appropriate number of cycles. Combinations of the above ranges are contemplated including, for example, a number of cycles between or equal to 2 and 10 cycles. Of course embodiments in which a number of cycles both larger and smaller than those noted above are also possible as the disclosure is not so limited.

In some embodiments, depositing a sublimable organic compound may include dipping one or more components of a propulsion system into a heated reservoir containing a sublimable barrier material (e.g., comprising an organic compound) in a melted state. In some embodiments, the method comprises leaving the one or more components in the heated reservoir for enough time to fill some or all voids (e.g., pores) of the component and allow cross diffusion of trapped gases so that some or all of the accessible volume of the component is either covered by and/or impregnated with the sublimable barrier material. In some embodiments, the one or more components may then taken out from the heated reservoir and directly centrifuged to remove excess sublimable barrier material from the surfaces. In some embodiments, the one or more components are then allowed to cool and the sublimable barrier material in the one or more components may be allowed to solidify. In some embodiments, the one or more components are then inspected for cracks and the process is repeated if cracks are found. Finally, in some embodiments, any excess of unwanted sublimable barrier material on surfaces of the one or more components is removed by exposure to mild vacuum (less than 100 milliTorr) at a temperature close to (but below) the melting temperature of the sublimable barrier material.

In some embodiments, a sublimable barrier material, such as an organic compound, may advantageously have a liquid density lower than its solid density. This may help avoid the component(s) (e.g., porous components) of the propulsion system becoming stressed and possibly fracturing after impregnation with and solidification of the sublimable barrier material due to avoiding volume increases during the solidfication. This is in contrast to the fracturing often times seen when water infiltrates components and expands during freezing. One exemplary material may include fluorene density with a solid density of 1.2 g/cc (grams per cubic centimeter), which drops to 1.15 g/cc as a liquid at its melting point and down to 1.1 g/cc at the highest temperatures used for deposition of fluorene onto/into one or more components of a propulsion system (e.g., about 180 degrees Celsius).

In some embodiments, methods of using a propulsion system are provided. For example, a propulsion system including a sublimable barrier may be deployed (e.g., into space and/or low Earth orbit) using a rocket or other appropriate delivery vehicle. The sublimable barrier may be passively removed from the propulsion system (e.g., by sublimation and subsequent diffusion from the system) over a predetermined amount of time. In some embodiments, the predetermined amount of time may correspond to a duration as disclosed herein over which substantially all of the sublimable barrier material will have sublimated and diffused out from the one or more components of the propulsion system. In some embodiments, the propulsion system may then be activated after the predetermined amount of time.

As used herein, a sublimable material, and other similar terms, shall have its ordinary meaning in the art which refers to a material that sublimates. Specifically, the material may transition from a solid to a gas when exposed to the environments and pressures over the durations described herein.

Turning now to the figures, several non-limiting embodiments are described in further detail. However, it should be understood that the current disclosure is not limited to only those specific embodiments described herein. Instead, the various disclosed components, features, and methods may be arranged in any suitable combination as the disclosure is not so limited.

Figure 1:
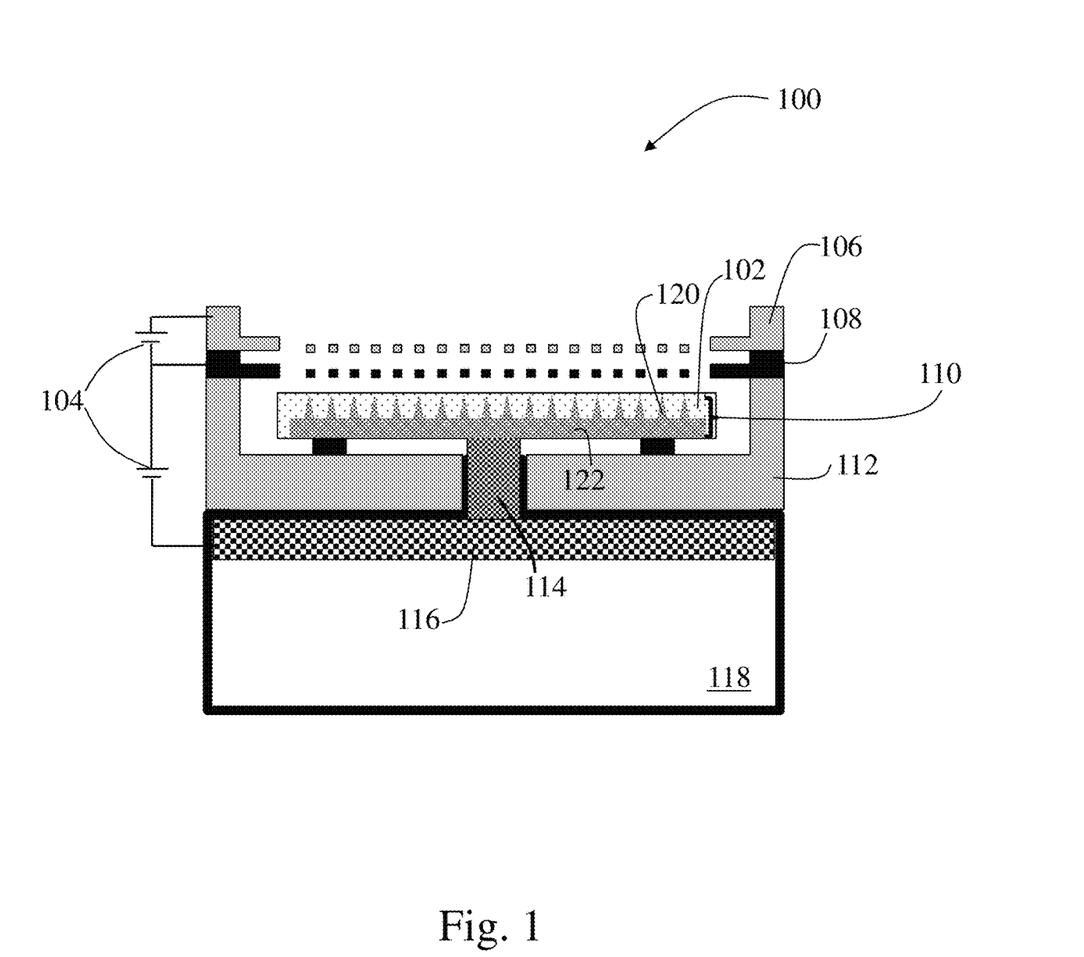
FIG. 1 is a schematic of an electrospray emitter array including a sublimable barrier according to an illustrative embodiment.

FIG. 1 is a schematic of a propulsion system corresponding to an electrospray device (e.g., an electrospray emitter array) 100, according to an illustrative embodiment. The depicted electrospray device 100 includes an emitter array 110 including one, or a plurality of, emitter bodies 120 disposed on and extending from a substrate 122. The one or more emitter bodies may have a cylindrical needle shape, a cone-like needle shape, a flat ribbon-like needle shape, or any other appropriate emitter body shape. In some embodiments, the emitter bodies may be porous. However, in other embodiment, the emitter bodies may include grooves or other surface features that guide propellant from a base to a tip of the one or more emitter bodies. The emitter array 110 may be housed in a thruster package 112 which may be made from any appropriate material including, for example, silicon. In some embodiments, the substrate and/or emitter array 110 may be disposed on, and in fluid communication with, a porous plug or isolation valve 114. The porous plug or isolation valve 114 may in turn be disposed on, and be in fluid communication with, a distal electrode 116 and/or a propellant source 118, such as a propellant reservoir. The porous plug or isolation valve 114 may serve as a fluid connection between the emitter array and the distal electrode and propellant source which may include a source of ions such as an ionic liquid, room temperature molten salt, or other appropriate propellant. As depicted in the figure, in some instances, the distal electrode may be disposed within the propellant source, which in the depicted embodiment, corresponds to being disposed within a propellant reservoir. In either case, the propellant within the depicted reservoir may be in fluid communication with the one or more emitter bodies of the emitter array through the one or more intervening components such as the distal electrode, porous plug or isolation valve, substrate, and/or any other appropriate component. Thus, a continuous flow path may exist between the propellant source, i.e. reservoir, and the one or more emitter bodies of the propulsion system when a sublimable barrier is not present.

In addition to the fluid path coupling a propellant source to the emitter array, a propulsion system 100 may include an extractor electrode (e.g., extractor grid) 108 which may be positioned downstream relative to the emitter array 110. An accelerator grid 106 may also be positioned downstream relative to the extractor grid 108. During use, for example, after a sublimable barrier is removed, a power source 104 may apply a voltage to the distal electrode 116 relative to the extractor electrode 108, thereby emitting a current in the form of a beam of ions from the tips of the one or more emitter bodies of the emitter array 110. The voltage may also be controlled to emit the ions with a Taylor cone.

In some embodiments, each of the emitter array 110, the porous plug/isolation valve 114, and distal electrode 116 may include a pore size gradient that has a pore size that decreases in a downstream direction such that the source of ions (e.g., ionic liquid) may be transported through capillarity to the tips of the emitter bodies of the emitter array. In some embodiments, the emitter array 110 which may have smaller-sized pores than the porous plug/isolation valve 114, which in turn which may have smaller-sized pores than the distal electrode 116 to create a pore size gradient with a pore size that decreases from the distal electrode 116 to the emitter array 110 such that the source of ions (e.g., ionic liquid) 118 may be transported through capillarity from the distal electrode 116 to the emitter array 110 once a sublimable barrier has been removed.

The various components described above may be made from any appropriate material. For example, an emitter body may be formed from a dielectric material (e.g., a ceramic, glass, or other oxide material), carbon, a metallic material (e.g., silver, stainless steel, tungsten, nickel, magnesium, molybdenum, titanium, any combination thereof, or any of these metals coated with a noble metal material such as platinum or gold), and/or any other appropriate material. The distal electrode may be made from a metallic material (e.g., silver, stainless steel, tungsten, nickel, magnesium, molybdenum, titanium, any combination thereof, or any of these metals coated with a noble metal material such as platinum or gold), carbon, or any other appropriate material. In some embodiments, the extractor electrode 108 can be fabricated from silicon or tungsten. The porous plug or isolation valve may be fabricated from a dielectric material (e.g., a ceramic, glass, or other oxide material), carbon, a metallic material (e.g., silver, stainless steel, tungsten, nickel, magnesium, molybdenum, titanium, any combination thereof, or any of these metals coated with a noble metal material such as platinum or gold), and/or any other appropriate material. Of course while specific materials are noted above, it should be understood that any appropriate material may be used with the various components that is capable of performing the desired operation and is compatible with the other materials and propellant of the propulsion system.

The various components of a propulsion system described above may be manufactured using any appropriate methods. However, in some embodiments, the various components, including the one or more emitter bodies and/or substrate may be manufactured using microfabrication techniques such as chemical wet etching, plasma dry etching, ion beam milling, laser milling, chemical vapor deposition, physical vapor deposition, deposition of nano-beads, molding, and/or any other appropriate manufacturing method. Accordingly, the current disclosure should not be limited to any particular form of manufacturing techniques for the various components disclosed herein.

As noted previously, a propulsion system 100 may include a sublimable barrier disposed along a flow path between a propellant source 118 and the ambient environment. A sublimable barrier material may be disposed on, disposed between, and/or impregnated within any of the one or more components of the propulsion system described above. For example, in the embodiment depicted in FIG. 1, a sublimable barrier 102 is associated with the one or more emitter bodies 120 and substrate 110. Specifically, depending on the particular embodiment, the sublimable barrier material may either coat the surface and/or may be impregnated into at least some of the pores, grooves, or other structures of the emitter bodies and/or substrate to form the sublimable barrier. Thus, the sublimable barrier may isolate the propellant source, i.e. the propellant reservoir, from the ambient surrounding environment prior to its removal.

Figure 2:
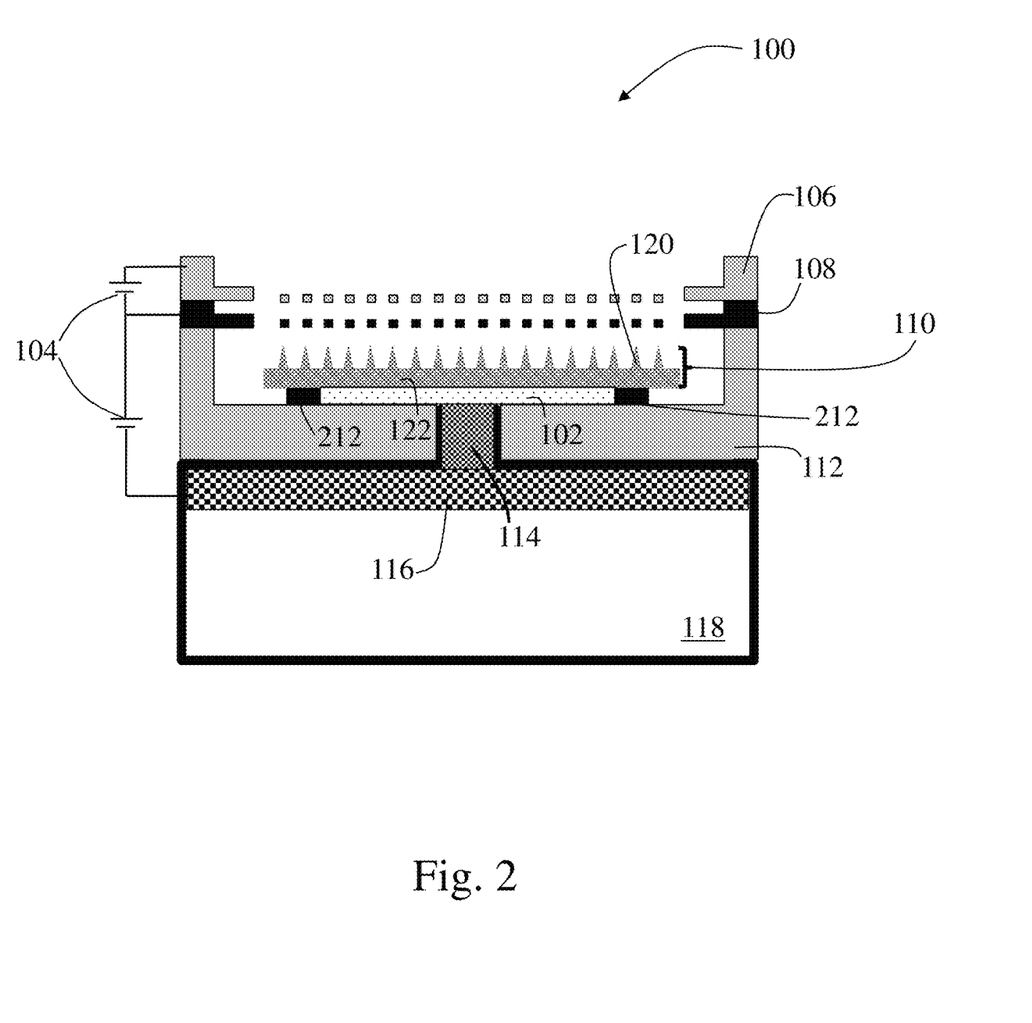
FIG. 2 is a schematic of an electrospray emitter array including a sublimable barrier according to an illustrative embodiment.
Figure 3:
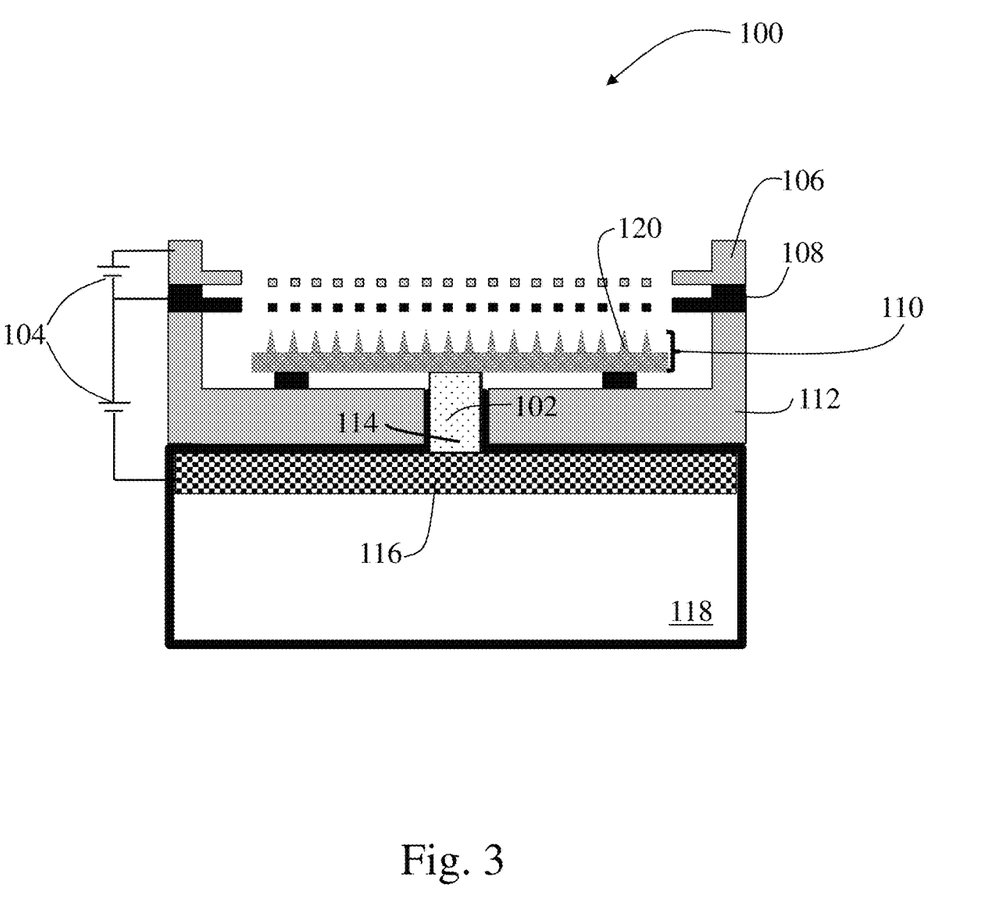
FIG. 3 is a schematic of an electrospray emitter array including a sublimable barrier according to an illustrative embodiment.

FIGS. 2 and 3 depict propulsion systems 100 similar to that of FIG. 1.

However, in these embodiments, the sublimable barrier 102 is positioned in another location between the propellant source 118 and the one or more emitter bodies 120 of the emitter array 110. For example, as shown in the figures, the material of the sublimable barrier 102 may either coat, partially fill, and/or completely fill the pores, grooves, or other structures of the porous plug or isolation valve 114. For instance, as shown in FIG. 2, the sublimable barrier may be contained within region between a support 212, the substrate 122, and the porous plug or isolation valve. Of course, the sublimable barrier may be associated with other components disposed between the propellant source and emitter array as the disclosure is not so limited. Further, in some embodiments, the sublimable barrier may be present within one or more components (e.g., 2 or more, 3 or more, 4 or more) of the propulsion system and/or there may be multiple sublimable barriers associated with multiple components of the propulsion system as the disclosure is not limited in this way.

Figure 4:
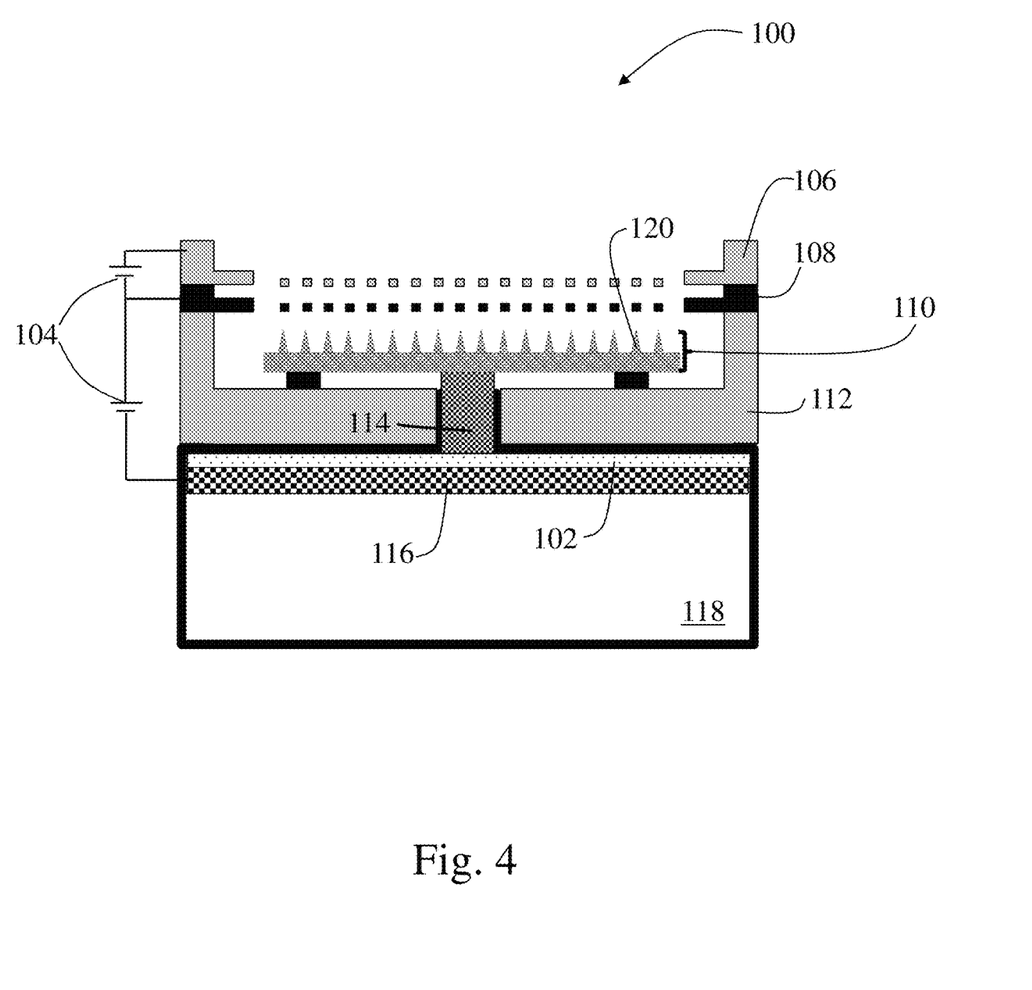
FIG. 4 is a schematic of an electrospray emitter array including a sublimable barrier according to an illustrative embodiment.

FIG. 4 is a schematic of a propulsion system 100 (e.g., electrospray emitter array) 100, according to yet another illustrative embodiment. In the depicted embodiment, a sublimable barrier 102 may be positioned within a propellant source 118, such as a propellant reservoir, to block the flow of propellant through an associate outlet and isolate the remaining portions of the propulsion system from the propellant. While the sublimable barrier may simply be positioned within a propellant source, in some instances it may be desirable to integrate the sublimable barrier with one or more components located within the propellant source. For example, in one embodiment, the sublimable barrier may be disposed on, coated on, and/or impregnated into a distal electrode 116 that is positioned within the propellant source adjacent to an outlet to the other portions of the propulsion system such as a porous plug 114, or other structure, fluidly coupling the propellant source to the remaining portions of the propulsion system.

It should be understood that while particular arrangements and locations of a sublimable barrier have been described above relative to the figures, a sublimable barrier may be located in any appropriate location and may be associated with any appropriate component capable of isolating a propellant of a propulsion system from an exterior ambient environment. Therefore, it should be understood that the current disclosure should not be limited to only the specific embodiments described relative to the figures.

Figure 5:
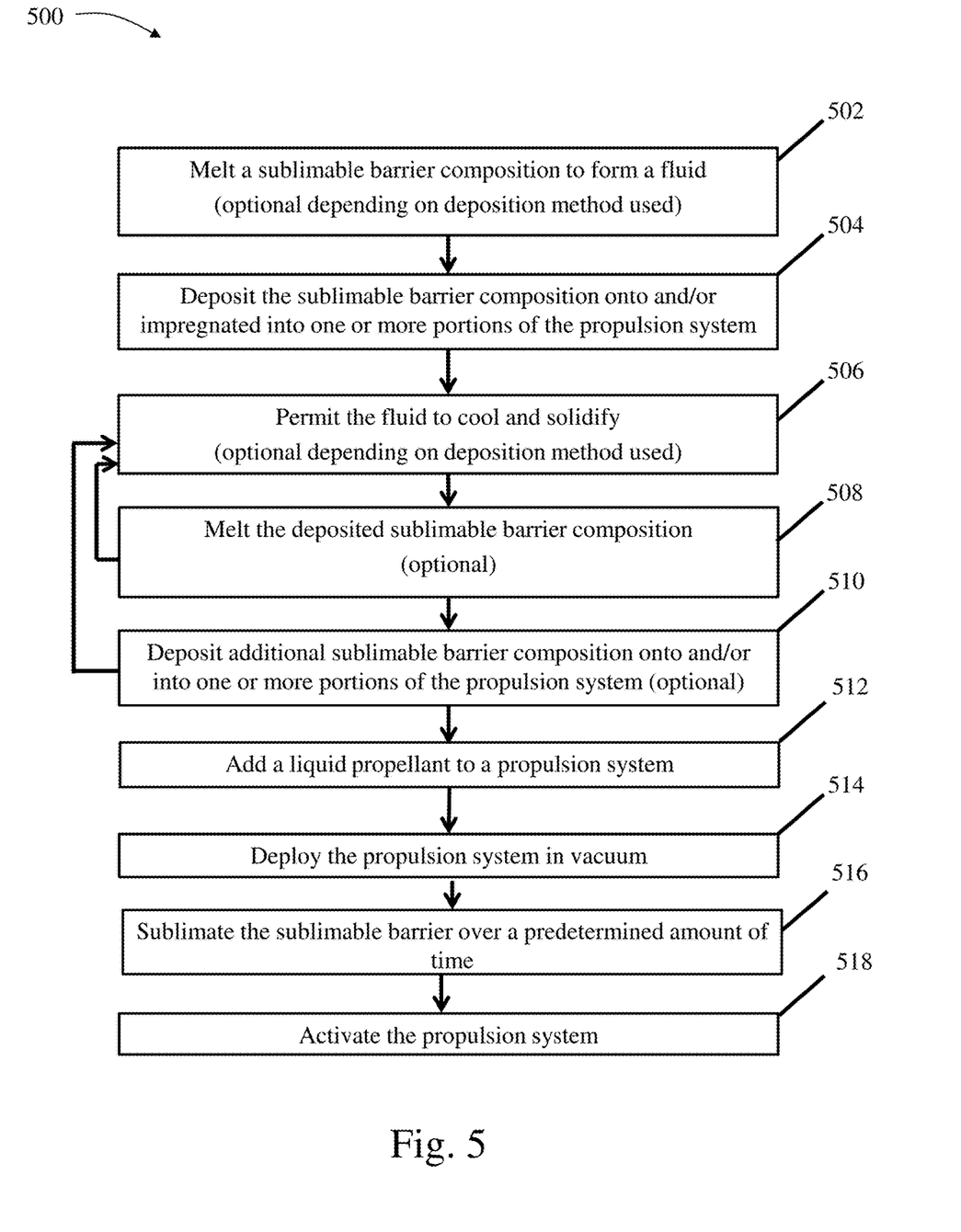
FIG. 5 is a flowchart illustrating methods for manufacturing and using an electrospray emitter, according to certain embodiments.

FIG. 5 is a flowchart illustrating methods for manufacturing and using a propulsion system according to one illustrative embodiment. As illustrated, at step 502, a sublimable barrier composition may be melted to form a fluid if the sublimable barrier composition is to be deposited as a fluid (e.g., by using pouring, dipping into a heated reservoir, or melt spinning). At step 504, the sublimable barrier composition is deposited onto and/or is impregnated into one or more portions of the propulsion system. In some embodiments, at step 506, the fluid is permitted to cool and solidify, if the sublimable barrier composition is deposited as a fluid (e.g., using melt spinning). In some embodiments, after deposition of the sublimable barrier composition, the solid deposited sublimable barrier composition is melted (e.g., at step 508), followed by permitting the sublimable barrier fluid to cool and solidify again (e.g., at step 506). In some embodiments, step 506 and step 508 are cycled at least 2 times (e.g., at least 3 times, at least 4 times, at least 5 times, at least 6 times, at least 7 times, at least 8, at least 9, at least 10 times). In some embodiments, after the sublimable barrier fluid is permitted to cool and solidify, additional sublimable barrier composition may be deposited onto and/or into one or more portions of the propulsion system (e.g., at step 510). As noted previously, this cyclic melting, solidification, and deposition of additional material may reduce the presence of defects within the sublimable barrier. Following completion of the deposition process for the sublimable barrier, in some embodiments, at step 512 a liquid propellant is added to the propulsion system. The propulsion system may then be deployed in a vacuum (e.g., at step 514) using any appropriate delivery method. After deployment, at step 516, the sublimable barrier may be sublimated over a predetermined amount of time which may be dictated by both the sublimation rate of the sublimable barrier material as well as the diffusion rate of the sublimated material from the system. Following sublimation and diffusion of the sublimable barrier out of the propulsion system (e.g., removal of the sublimable barrier from the propulsion system), at step 520, the propulsion system may be activated and operated normally.

Example of a Propulsion System with a Sublimable Barrier

The Inventors were able to reproduce the conditions of launch in a laboratory including both quick de-pressurization (e.g., 5 minutes) to 0.5 Torr and random vibration at 10 Grms (root mean square acceleration). Using this experimental setup, a propulsion system including an electrospray thruster was tested. The propulsion system included a temporary sublimable barrier made of fluorene, with which porous glass for the propulsion system was impregnated twice. The resulting barrier was disposed between the EMI-CF$_3$BF$_3$ (1-ethyl-3-methylimidazolium trifluoromethyltrifluoroborate) propellant and the surrounding ambient atmosphere outside of the propulsion system within the experimental setup.

During testing, the sublimable barrier acted as a passive valve for the propellant. Specifically, the sublimable barrier was observed to sublimate and diffuse out of the propulsion system over a time period of about 10 days. After this passive removal of the sublimable barrier, the electrospray thruster was able to operate normally as confirmed by monitoring of current over a period of 8 (eight) days of continuous firing and subsequent inspection to verify complete propellant exhaustion. Thus, this experiment confirmed that it was possible to use a sublimable barrier to physically isolate a propellant of a propulsion system from an exterior ambient environment both prior to, and during, deployment which may prevent leakage and/or contamination of the propellant.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:
1. A propulsion system, comprising:
   a propellant; and
   a sublimable barrier comprising a solid sublimable organic compound physically isolating the propellant from an ambient environment outside of the propulsion system, wherein the sublimable barrier is configured to prevent flow of the propellant to one or more components of the propulsion system until a majority of the sublimable barrier has been sublimated over a predetermined amount of time after exposure to a vacuum, and wherein the predetermined amount of time is less than or equal to 5 weeks.

2. The propulsion system of claim 1, wherein the sublimable barrier is disposed along a flow path between the propellant and the ambient environment.

3. The propulsion system of claim 1, wherein the one or more components include one or more emitter bodies.

4. The propulsion system of claim 3, wherein the one or more emitter bodies are disposed along a flow path between the propellant and the ambient environment.

5. The propulsion system of claim 3, wherein the sublimable barrier coats and/or is impregnated within the one or more emitter bodies.

6. The propulsion system of claim 3, comprising one or more porous components disposed between the one or more emitter bodies and the propellant, wherein the one or more porous components are coated and/or impregnated with the sublimable barrier.

7. The propulsion system of claim 1, wherein the sublimable barrier is solid at 20° C. and 1 atmosphere.

8. The propulsion system of claim 1, wherein the sublimable barrier has a vapor pressure greater than or equal to 0.0001 Pascal (Pa) and less than or equal to 10 Pa at 25° C.

9. The propulsion system of claim 1, wherein the sublimable barrier comprises at least one of fluorene, biphenyl, and fluoranthene, or a mixture thereof.

10. The propulsion system of claim 1, wherein the propulsion system is an electrospray thruster.

11. A method of making a propulsion system, comprising:
    depositing a sublimable organic compound onto and/or within one or more components of the propulsion system to form a sublimable barrier that physically isolates a propellant from an ambient environment outside of the propulsion system to prevent flow of the propellant to one or more components of the propulsion system until a majority of the sublimable barrier has been sublimated over a predetermined amount of time after exposure to a vacuum, wherein the predetermined amount of time is less than or equal to 5 weeks.

12. The method of claim 11, wherein the one or more components are disposed along a flow path between the propellant and the ambient environment.

13. The method of claim 12, wherein the one or more components are one or more emitter bodies.

14. The method of claim 12, wherein the one or more components are disposed between one or more emitter bodies of the propulsion system and the propellant.

15. The method of claim 11, wherein depositing the sublimable organic compound includes melting the sublimable organic compound and cooling and solidifying the sublimable organic compound.

16. The method of claim 11, wherein depositing the sublimable organic compound includes dipping the one or more components of the propulsion system into a heated reservoir containing the sublimable organic compound in a melted state.

17. The method of claim 11, further comprising cyclically melting and solidifying the sublimable organic compound multiple times.

18. The method of claim 17, further comprising depositing more of the sublimable organic compound onto and/or within the one or more components during the cyclic melting and solidifying of the sublimable organic compound.

19. The method of claim 11, wherein the sublimable organic compound is solid at 20° C. and 1 atmosphere.

20. The method of claim 11, wherein the sublimable organic compound has a vapor pressure greater than or equal to 0.0001 Pascal (Pa) and less than or equal to 10 Pa at 25° C.

21. The method of claim 11, wherein the sublimable organic compound comprises at least one of fluorene, biphenyl, and fluoranthene, or a mixture thereof.

22. The method of claim 12, wherein the propulsion system is an electrospray thruster.

23. A method of using a propulsion system, comprising:
deploying the propulsion system in a vacuum; and
sublimating a majority of a sublimable barrier isolating a propellant from an ambient environment outside of the propulsion system over a predetermined amount of time after deploying the propulsion system in the vacuum such that prior to sublimation, flow of the propellant is prevented, and as the sublimable barrier sublimates the propellant flows towards the ambient environment outside of the propulsion system, wherein the predetermined amount of time is less than or equal to 5 weeks.

24. The method of claim 23, further comprising activating the propulsion system after the predetermined amount of time.

25. The method of claim 23, wherein the propulsion system is an electrospray thruster.

26. The method of claim 23, wherein the predetermined amount of time is greater than or equal to 30 minutes.

27. The method of claim 23, wherein the sublimable barrier is a sublimable organic compound.

28. The method of claim 27, wherein the sublimable organic compound comprises at least one of fluorene, biphenyl, and fluoranthene, or a mixture thereof.

29. The method of claim 23, wherein the vacuum is less than or equal to 10,000 microPascals.

30. The propulsion system of claim 1, wherein the solid sublimable organic compound is configured to transition from a solid to a gas when exposed to vacuum.

31. The method of claim 11, wherein the sublimable organic compound is configured to transition from a solid to a gas when exposed to vacuum.

32. The method of claim 23, wherein the sublimable barrier is configured to transition from a solid to a gas over the predetermined amount of time when exposed to the vacuum.

33. A propulsion system, comprising:
a propellant; and
a sublimable barrier comprising a solid sublimable organic compound physically isolating the propellant from an ambient environment outside of the propulsion system, wherein the sublimable barrier prevents flow of the propellant to one or more components of the propulsion system until at least some of the sublimable barrier has been sublimated, and wherein the sublimable barrier has a vapor pressure greater than or equal to 0.0001 Pascal (Pa) and less than or equal to 10 Pa at 25° C.

34. The propulsion system of claim 33, wherein the sublimable barrier is disposed along a flow path between the propellant and the ambient environment.

35. The propulsion system of claim 33, wherein the one or more components include one or more emitter bodies.

36. The propulsion system of claim 35, wherein the one or more emitter bodies are disposed along a flow path between the propellant and the ambient environment.

37. The propulsion system of claim 35, wherein the sublimable barrier coats and/or is impregnated within the one or more emitter bodies.

38. The propulsion system of claim 35, comprising one or more porous components disposed between the one or more emitter bodies and the propellant, wherein the one or more porous components are coated and/or impregnated with the sublimable barrier.

39. A method of making a propulsion system, comprising:
depositing a sublimable organic compound onto and/or within one or more components of the propulsion system to form a sublimable barrier that physically isolates a propellant from an ambient environment outside of the propulsion system to prevent flow of the propellant to one or more components of the propulsion system until at least some of the sublimable barrier has been sublimated, wherein the sublimable organic compound has a vapor pressure greater than or equal to 0.0001 Pascal (Pa) and less than or equal to 10 Pa at 25° C.

40. The method of claim 39, wherein the one or more components are disposed along a flow path between the propellant and the ambient environment.

41. The method of claim 40, wherein the one or more components are one or more emitter bodies.

42. The method of claim 39, wherein depositing the sublimable organic compound includes melting the sublimable organic compound and cooling and solidifying the sublimable organic compound.

43. The method of claim 39, wherein depositing the sublimable organic compound includes dipping the one or more components of the propulsion system into a heated reservoir containing the sublimable organic compound in a melted state.

44. The method of claim 39, further comprising cyclically melting and solidifying the sublimable organic compound multiple times.

* * * * *